July 3, 1934.    W. B. MILLER    1,965,555
ARC WELDING ELECTRODE
Filed Feb. 23, 1933
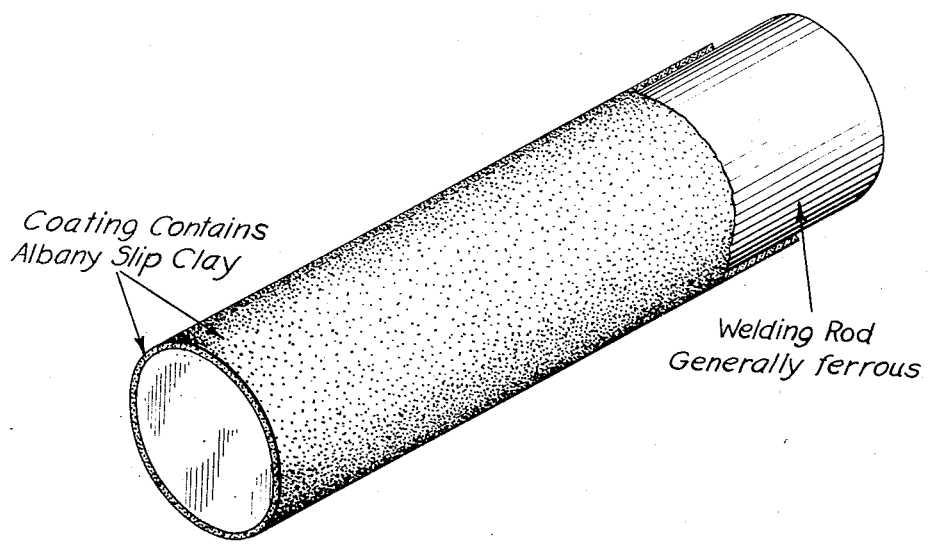
INVENTOR
WILBER B. MILLER
BY
ATTORNEY Patented July 3, 1934

1,965,555

UNITED STATES PATENT OFFICE 1,965,555

ARC WELDING ELECTRODE

Wilber B. Miller, Flushing, N. Y., assignor to Oxweld Acetylene Company, a corporation of West Virginia Application February 23, 1933, Serial No. 658,023

8 Claims. (Cl. 219—8)

This invention relates to welding rods and especially rods adapted for use as electrodes in metallic arc welding. The novel features of the invention reside especially in the coating employed on the rod. The distinguishing feature of this invention is the use of Albany slip clay in the coating.

An object of the invention is to provide a cheap electrode having a silicate coating which shall have desirable properties as evidenced by the formation of sound welds. This and other objects of my invention will be evident from the accompanying specification having reference to the accompanying drawing in which the single figure is a view of a welding rod illustrating one embodiment of my invention, the rod having a portion of the coating broken away.

I have found that Albany slip clay is a desirable ingredient for welding rod coatings, especially when the rods are to be used as electrodes. It is especially advantageous because of its low melting point. It furnishes the necessary silica for the formation of silicates which take up any iron oxide formed during the welding operation. Another advantageous feature of the use of Albany slip clay is that it acts as a colloid and tends to prevent the settling of the slurry during manufacturing operations. It has been proposed to use clay in a coating for welding rods in the past. For example the patent to Lloyd and Hill 1,599,056, patented September 7, 1926, proposes the use of china clay and fire clay. The patent to Languepin 1,302,386, patented April 29, 1919, proposes the use of kaolin. However these clays have high fusing points and are less desirable than Albany slip clay in flux mixtures in obtaining the desirable results produced by my improved electrode.

Albany slip clay is a well known, easily procurable clay fusing at about 1230 to 1250° C. It has been used in the past for glazing stoneware and for a fused bond in grinding wheels. A typical analysis by the Ohio Geologic Survey is as follows:

| | Per cent |
|---|---|
| Silica | 55.60 |
| Alumina | 14.80 |
| Ferric oxide | 5.80 |
| Calcium oxide | 5.70 |
| Magnesium oxide | 2.48 |
| Potassium oxide | 3.23 |
| Sodium oxide | 1.07 |
| Manganese oxide | 0.14 |
| Phosphorus pentoxide | 0.15 |
| Water | 5.18 |
| Carbon dioxide plus moisture | 4.94 |

Various combinations may be used in employing Albany slip clay as a coating. The following compositions have been found to work satisfactorily on various types of ferrous electrodes:

| Coating | I | II | III | IV | V | VI | VII |
|---|---|---|---|---|---|---|---|
| Albany slip clay | 50 | 50 | 60 | 60 | 50 | 50 | 60 |
| Calcium carbonate | 13 | 40 | 25 | 25 | 40 | 13 | 25 |
| Dextrin | 3 | 5 | | 10 | | | 10 |
| Mn ore | | | | | | 5 | |
| Rutile | | | 10 | 10 | | 5 | |
| Ilmenite | | | | | | | 18 |
| Carbon | | 5 | 5 | 5 | | | 5 |
| Cromaloy flux | | 5 | | | 10 | | |
| Feldspar | | 10 | | | | 19 | |

In the above table the numbers indicate parts by weight.

Coating I was used on a rod designed to give a high tensile strength; coating II on a rod containing 5% chromium; coatings III, IV and VII on general purpose rods; coating V on a rod containing 18% chromium and 8% nickel; coating VI on a steel rod having a heavy coating. The carbon used may be any finely divided form of carbon. I have found graphite to be especially suitable. The chromaloy flux has the following composition:

Borax ($Na_2B_4O_7 \cdot 10H_2O$) 3.5 to 4 parts by weight.
Silica ($SiO_2$) 1 part by weight.

These materials are fused to a glass and pulverized.

In using the above flux mixtures a water-glass solution is made by diluting the commercial syrup by adding one part of water to 1½ to 2 parts of commercial water-glass syrup. The flux mixture is then added to an amount to form a thin slurry. The bare steel electrodes are then dipped in the slurry and dried. The slip clay is present in an amount greater than any other material and generally in an amount greater than the sum of all other materials. On account of its colloidal properties the materials remain in a suspended state for a long time. This is very desirable since it eliminates the danger of segregation due to the settling out of the heavier materials. Without this clay a thick slurry must be used, or the slurry must be agitated during use in order to prevent settling.

In making up a typical coating 35½ lbs. of mixture IV was mixed with 7 gallons of water-glass solution containing 1½ parts of commercial syrup to 1 part of water. Electrodes were dipped in this mixture and dried. They had a thin coating that acted as a good arc stabilizer and the electrodes worked well in all welding positions. A weld made in ⅜ inch thick plate with 5/32 inch diameter electrodes coated as stated above had a tensile strength of 64,500 lbs. per sq. inch and an elongation of 14% in the free bend test.

While I have given typical examples of mixtures adapted for use in preparing coatings it should be noted that various compositions may be employed. For example in preparing a rod in accordance with Formula IV above, the following limits appear satisfactory:

| | Parts by weight |
|---|---|
| Albany slip clay | 50 to 75 |
| Alkaline earth carbonate | 10 to 45 |
| Rutile or ilmenite | 1 to 20 |
| Dextrin | 1 to 10 |
| Carbon | 1 to 10 |
| Feldspar | 0 to 20 |

Various other changes may be made within the spirit of my invention and I do not desire to be limited to any particular composition except as set forth in the following claims.

I claim:

1. A welding rod having a coating containing a substantial amount of Albany slip clay.

2. A welding rod having a coating consisting predominantly of Albany slip clay.

3. A welding rod having a coating containing Albany slip clay as the principal constituent, calcium carbonate and a binder.

4. A welding rod having a coating comprising Albany slip clay as the principal constituent, an alkaline earth carbonate, a titanium ore, carbon and a binder.

5. A welding rod having a coating comprising Albany slip clay 50 to 75 parts, alkaline earth carbonate 10 to 45 parts, titanium ore 1 to 20 parts, dextrin 1 to 10 parts, carbon 1 to 10 parts and a binder.

6. A ferrous welding rod having a coating comprising Albany slip clay 50 to 75 parts, alkaline earth carbonate 10 to 45 parts, titanium ore 1 to 20 parts, dextrin 1 to 10 parts, carbon 1 to 10 parts, feldspar 1 to 20 parts and a binder.

7. A ferrous welding rod having a coating comprising Albany slip clay substantially 60 parts, calcium carbonate substantially 25 parts, dextrin substantially 10 parts, rutile substantially 10 parts, carbon substantially 5 parts and a water glass binder.

8. A welding rod having a coating containing from about 40 to about 80% by weight of Albany slip clay.

WILBER B. MILLER.